US008234488B1

(12) United States Patent
Riach et al.

(10) Patent No.: US 8,234,488 B1
(45) Date of Patent: Jul. 31, 2012

(54) SYSTEM AND METHOD FOR CONTROLLING MODE SWITCHES IN HARDWARE

(75) Inventors: Duncan A. Riach, Mountain View, CA (US); Michael A. Ogrinc, San Francisco, CA (US); Leslie E. Neft, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1280 days.

(21) Appl. No.: 11/945,218

(22) Filed: Nov. 26, 2007

Related U.S. Application Data

(60) Provisional application No. 60/988,881, filed on Nov. 19, 2007, provisional application No. 60/987,388, filed on Nov. 12, 2007.

(51) Int. Cl.
*G06F 1/24* (2006.01)
*G06F 9/00* (2006.01)

(52) U.S. Cl. ........................................ 713/100; 345/778

(58) Field of Classification Search .................. 713/100; 345/778
See application file for complete search history.

(56) References Cited

U.S. PATENT DOCUMENTS

| | | | |
|---|---|---|---|
| 5,724,525 A * | 3/1998 | Beyers et al. ................... 705/40 |
| 6,104,359 A * | 8/2000 | Endres et al. ................. 345/589 |
| 6,828,991 B2 * | 12/2004 | Nason et al. ................... 715/778 |
| 7,366,886 B2 * | 4/2008 | Yoo ...................................... 713/1 |
| 2004/0113934 A1 * | 6/2004 | Kleinman et al. ............. 345/732 |
| 2006/0190482 A1 * | 8/2006 | Kishan et al. ............. 707/103 Y |
| 2007/0101343 A1 * | 5/2007 | Andrews et al. ............... 719/321 |
| 2007/0203682 A1 * | 8/2007 | Gummalla et al. ............. 703/13 |
| 2008/0246775 A1 * | 10/2008 | Fisher et al. ................... 345/589 |

* cited by examiner

*Primary Examiner* — Thomas Lee
*Assistant Examiner* — Xuxing Chen
(74) *Attorney, Agent, or Firm* — Patterson & Sheridan, LLP

(57) ABSTRACT

One embodiment of the present invention sets forth a technique for controlling mode switches in hardware. The resource manager includes an "is mode possible" function that evaluates a given mode in conjunction with the limitations of the hardware to determine if the given mode is feasible. The display driver is configured to call this function to validate a proposed mode before generating commands specifying the state changes for the display heads. The display software interface hardware module within the GPU processes these commands and follows a standard sequence of steps to implement the mode switch. The steps may include interrupts to the resource manager to re-validate the proposed mode, again calling the "is mode possible" function, or perform operations that are not yet supported in the hardware. Advantageously, controlling mode switches in hardware enables less error-prone, more efficient, and more discerning mode switches relative to controlling mode switches in software.

19 Claims, 5 Drawing Sheets

SYSTEM AND METHOD FOR CONTROLLING MODE SWITCHES IN HARDWARE

CROSS-REFERENCE TO RELATED APPLICATIONS

The current application claims the benefit of U.S. Provisional Application No. 60/987,388, filed on Nov. 12, 2007 and having the title, "System and Method for Controlling Mode Switches in Hardware." This related application is hereby incorporated by reference in its entirety. The current application also claims the benefit of U.S. Provisional Application No. 60/988,881, filed on Nov. 19, 2007 and having the title, "System and Method for Controlling Mode Switches in Hardware." This related application is also hereby incorporated by reference in its entirety.

BACKGROUND OF THE INVENTION

1. Field of the Invention

The present invention relates generally to the field of graphics processing and more specifically to a system and method for controlling mode switches in hardware.

2. Description of the Related Art

A typical computing system includes a central processing unit (CPU), an input device, a system memory, one or more graphics processing units (GPUs), and one or more display devices. A variety of software application programs may run on the computing system. The CPU usually executes the overall structure of the software application program and configures the GPUs to perform specific tasks in the graphics pipeline (the collection of processing steps performed to transform 3-D scenes into 2-D images). Components within the GPUs then transmit the 2-D images through video connectors and video cables to drive the display devices.

The CPU typically configures the computing system to reflect a variety of display-related settings, such as the display resolution, the refresh rate, the pixel depth, and the type of display devices used for display purposes. As the CPU is executing, the user and the software application programs may request changes to one or more display-related settings. For example, a user may request a higher refresh rate for a display device. The CPU may then configure the computing system to reflect the changes to the display-related settings—a procedure known as a mode switch. A mode switch may include a variety of tasks to ensure a clean transition, such as disabling and enabling phase-locked loops (PLLs) and putting display devices into a blanked or a shutdown level of operation.

In one approach to implementing a mode switch, various software programs, such as the operating system, the display driver, and the resource manager, determine and execute the sequence of register accesses required to implement the mode switch. The software includes hardware-specific details to determine which registers need to be programmed, the correct sequence in which to program the registers, and the time required between types of changes, such as the time required after changing the frequency of a PLL before unblanking an associated display device. One drawback to this approach is that implementing such hardware-specific functionality in software has proven to be complicated and error-prone. Moreover, if the hardware design is ever modified, then the software usually needs to be updated to reflect the new hardware design. In addition, each mode switch may include numerous time-consuming software-hardware related interactions, decreasing overall system efficiency.

Another drawback is that the software may not fully appreciate the limitations of the hardware and, therefore, may schedule a sequence of changes that overburden the hardware. For example, suppose there are two display devices in the computing system that share the local memory, and the computing system is using the entire local memory bandwidth. Suppose further that the user requests a change in the display resolution of one of the display devices from 1280-by-1024 pixels to 1900-by-1200 pixels and a simultaneous change in the display resolution of the other display device from 1900-by-1200 pixels to 1280-by-1024 pixels. If the software does not accurately reflect the limitations of the hardware, such as the limited local memory bandwidth, then the sequence of tasks that the software orchestrates to accomplish the mode switch may inadvertently cause the computing system to pass through a transient mode where the display resolution of both of the displays may be set to 1900-by-1200 pixels. Consequently, the local memory bandwidth may be exceeded, and the data sent to the display devices may become corrupted.

As the foregoing illustrates, what is needed in the art is a more effective technique for controlling and executing mode switches.

SUMMARY OF THE INVENTION

One embodiment of the present invention sets forth a method for implementing a mode switch to change a plurality of display parameters used to display images. The method includes the steps of receiving a display setting change request, generating a proposed mode associated with the display setting change request, generating one or more parameter state changes for one or more display heads that correspond to the proposed mode, inserting a plurality of commands into a push buffer to convey the parameter state changes to a processing unit, and setting up one or more operations to switch to the proposed mode associated with the parameter state changes specified by the plurality of commands in the push buffer. The method also includes the steps of transmitting a first interrupt to a resource manager software engine to validate the proposed mode, and performing the one or more operations to switch to the proposed mode.

One advantage of the disclosed method is that controlling and executing mode switches primarily in hardware instead of software reduces the quantity of hardware-specific details included in the associated software. Therefore, the software is both simpler and less error-prone relative to software used in prior-art approaches. In addition, by reducing hardware-software interactions, the efficiency of mode switches is increased and, consequently, the length of time that the display devices are blanked or shutdown during some mode switches is decreased.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
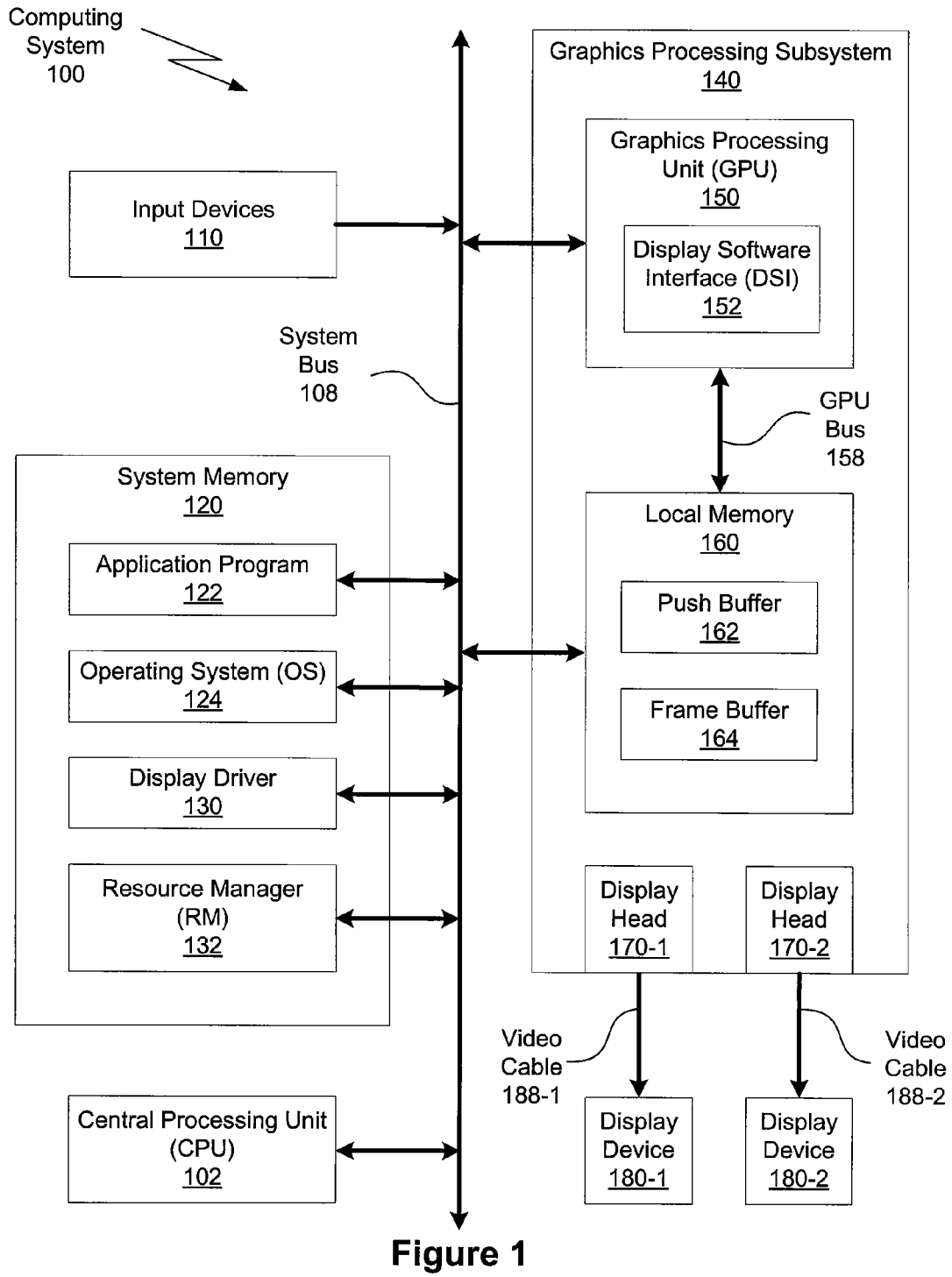
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a system bus 108, a central processing unit (CPU) 102, input devices 110, a system memory 120, a graphics processing subsystem 140, two display devices 180, and two video cables 188. In alternate embodiments, the computing system 100 may include more or less than two display devices 180 and more or less than two video cables 188. In some embodiments, the CPU 102, portions of the graphics processing subsystem 140, the system bus 108, or any combination thereof, may be integrated into a single processing unit. Further, the functionality of the graphics processing subsystem 140 may be included in a chipset or in some other type of special purpose processing unit or co-processor.

The system bus 108 connects the CPU 102, the input devices 110, the system memory 120, and the graphics processing subsystem 140. In alternate embodiments, the system memory 120 may connect directly to the CPU 102. The CPU 102 receives user input from the input devices 110, executes programming instructions stored in the system memory 120, operates on data stored in the system memory 120, and configures the graphics processing subsystem 140 to perform specific tasks in the graphics pipeline. The system memory 120 typically includes dynamic random access memory (DRAM) used to store programming instructions and data for processing by the CPU 102 and the graphics processing subsystem 140. The graphics processing subsystem 140 receives instructions transmitted by the CPU 102 and processes the instructions in order to render and display graphics images on the display devices 180.

The system memory 120 includes an operating system (OS) 124, one or more application programs 122, a display driver 130, and a resource manager (RM) 132. The operating system 124 is typically the master control program of the computing system 100. Among other things, the operating system 124 manages the resources of the computing system 100, such as the system memory 120, and forms a software platform on top of which the application program(s) 122 may run. The operating system 124 and the application program 122 transmit instructions to the display driver 130 that are designed to operate within the graphics processing subsystem 140. The display driver 130 is configured to translate these instructions into commands that execute on components within the graphics processing subsystem 140. The resource manager 132 is a control program that underlies the drivers, such as the display driver 130. Among other things, the resource manager 132 is configured to handle interrupts from the graphics processing subsystem 140 and manage various interactions between the drivers.

The graphics processing subsystem 140 includes a graphics processing unit (GPU) 150, a local memory 160, a GPU bus 158, and two display heads 170. The GPU 150 is configured to communicate with the local memory 160 via the GPU bus 158. The GPU 150 may receive instructions transmitted by the CPU 102, process the instructions in order to render graphics data and images, and store these images in the local memory 160. Subsequently, the GPU 150 may transmit certain graphics images stored in the local memory 160 to the display heads 170. The display heads 170 may convey these graphics images through the video cables 188 for display on the display devices 180. In alternative embodiments, the graphics processing subsystem 140 may include more than one GPU 150 and more or less than two display heads 170. The GPU 150 may be provided with any amount of local memory 160, including none, and may use local memory 160 and system memory 120 in any combination for memory operations.

The local memory 160 is configured to include a push buffer 162 and a frame buffer 164. The push buffer 162 may be used to store a sequential stream of commands that is transmitted from the display driver 130. Subsequently, the display driver 130 may configure components within the GPU 150 to process the commands in the push buffer 162. The frame buffer 164 stores data for at least one two-dimensional surface that may be used to drive the display devices 180. Furthermore, the frame buffer 164 may include more than one two-dimensional surface so that the GPU 150 can render to one two-dimensional surface while a second two-dimensional surface is used to drive the display devices 180.

As shown, the GPU 150 includes a display software interface (DSI) 152. The display software interface 152 may read display configuration commands from the push buffer 162 and process these commands in order to configure the computing system 100 to reflect display-related settings, such as display resolutions and refresh rates. The display software interface 152 may configure the display devices 180 by updating the states (i.e., settings) of various display-related parameters associated with the display heads 170. For example, the display software interface may configure the resolution of the display device 180-1 by updating the resolution parameter of the display head 170-1.

The display heads 170 may include hardware, software, or any combination thereof used to configure and drive the display devices 180. Each display head 170 may configure and drive the set of the display devices 180 that are attached to that particular display head 170. As shown, the display device 180-1 is attached to the display head 170-1, and the display device 180-2 is attached to the display head 170-2. Each display head 170 may be configured to function at a specific operating level. The operating level of a display head 170 may affect the operation of the display devices 180 that are attached to that particular display head 170. For example, if the operating level of the display head 170-1 is "active," the display device 180-1 may operate normally. However, if the operating level of the display head 170-1 is "blank," then the raster of the display device 180-1 may be running, but the display device 180-1 may display a black screen. And, if the operating level of the display head 170-1 is "shutdown," then the raster of the display devices 180-1 may stop running and the display device 180-1 may not display anything. In alternate configurations, there may be more or less than two display heads 170 and more or less than two display devices 180. In some configurations, more than one display device 180 may be attached to a single display head 170.

The display devices 180 are one or more output devices capable of emitting a visual image corresponding to an input data signal. For example, a display device may be built using a cathode ray tube (CRT) monitor, a liquid crystal display (LCD), or any other suitable display system. The input data signals to the display devices 180 are typically generated by scanning out the contents of one or more frames of image data that is stored in the frame buffer 164.

Figure 2:
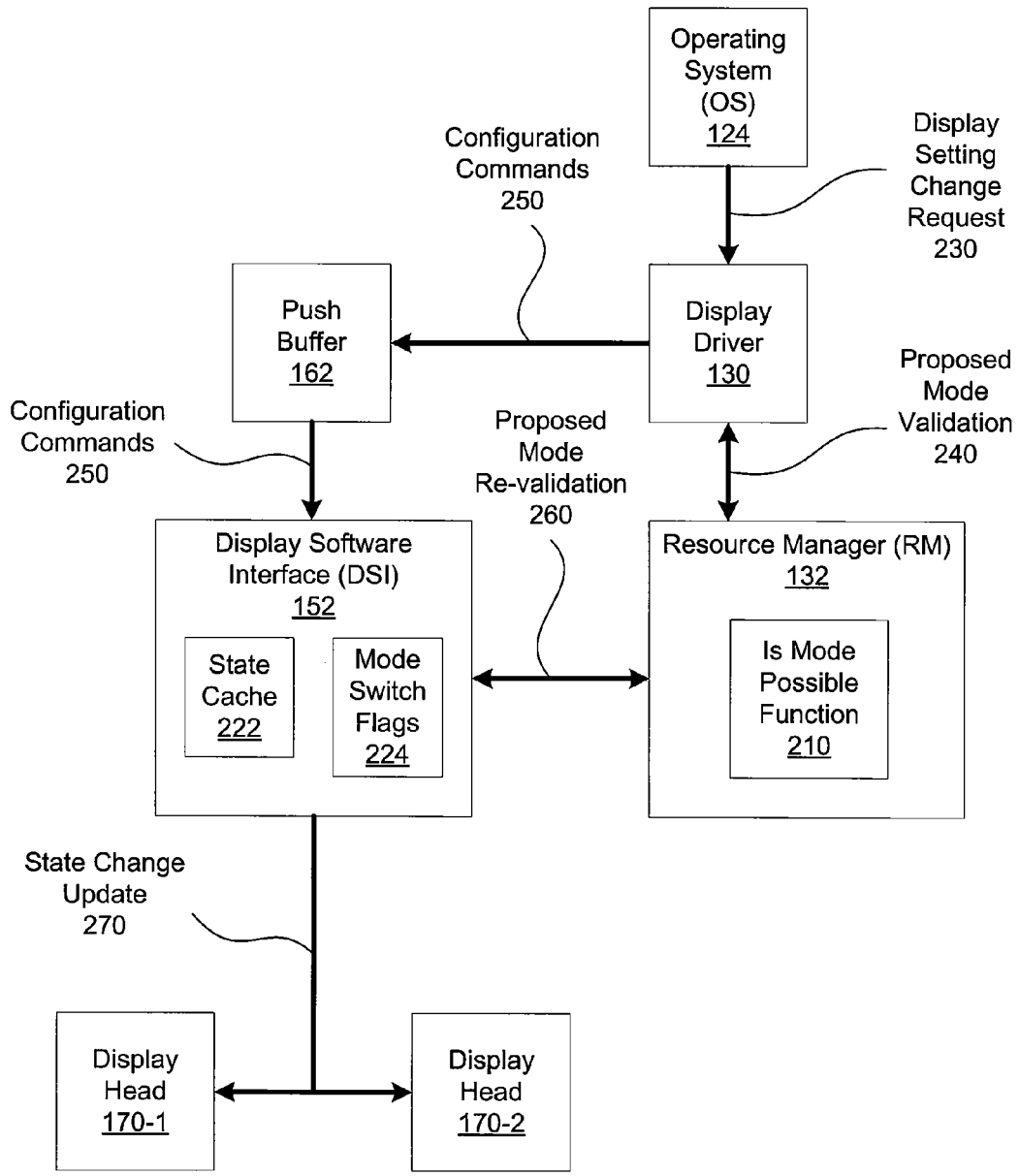
FIG. 2 is a conceptual diagram of components in the local memory and the graphics processing system of FIG. 1 that enable the hardware to control mode switches, according to one embodiment of the invention.

FIG. 2 is a conceptual diagram of components in the local memory 160 and the graphics processing system 140 of FIG. 1 that enable hardware to control mode switches, according to one embodiment of the invention. The set of parameter states associated with the display heads 170 is known as a "mode." A mode switch is the process of configuring the display heads 170 to reflect changes to the display-related settings, such as the resolution of the display device 180-1. As described in greater detail herein, the computing system 100 is configured to execute a mode switch using the operating system 124, the display driver 130, the resource manager 132, the push buffer 162, the display software interface 152, and the display heads 170.

Upon receiving a request to change display-related settings, the operating system 124 is configured to transmit a display setting change request 230 to the display driver 130. The display driver 130 is configured to receive the display setting change request 230, confirm that the display setting change request 230 is supported by the hardware within the computing system 100, and transmit configuration commands 250 to the push buffer 162 for processing by the display software interface 152. The display setting change request 230 may include a variety of changes to display-related settings. The display driver 130 is configured to evaluate the display setting change request 230 in conjunction with the current mode to generate a proposed mode that reflects the display setting change request 230. Subsequently, the display driver 130 executes a proposed mode validation 240 operation by passing the proposed mode to an "is mode possible" function 210 within the resource manager 132. As detailed below, in executing the "is mode possible" function 210, the resource manager 132 determines whether the proposed mode is supported by the hardware within the computing system 100. If the resource manager 132 determines that the proposed mode is possible, then the display driver 130 determines the set of changes to the parameter states associated with the display heads 170 that are required to implement the proposed mode. The display driver 130 then generates the configuration commands 250, which specify these state changes, transmits the configuration commands 250 to the push buffer 162, and configures the display software interface 152 to process the push buffer 162.

The display software interface 152 includes a state cache 222 and mode switch flags 224. The display software interface 152 is configured to execute a standard sequence of hardware operations to perform a mode switch. However, to implement and optimize a specific mode switch, the display software interface 152 first customizes the sequence of mode switch operations by setting a variety of control registers, such as the state cache 222 and the mode switch flags 224. For example, the display software interface 152 may process the configuration commands 250 in the push buffer 162, thereby generating proposed parameter states that are the target of the mode switch. The display software interface 152 stores the proposed parameter states in the state cache 222 and, subsequently, uses the current mode in conjunction with the proposed parameter states to customize the sequence of mode switch operations. Then, when the display software interface 152 executes the mode switch, the parameter states associated with the display heads 170 are configured as specified in the state cache 222.

In one implementation, the standard sequence of mode switch operations includes a single state change update 270 to change the parameter states associated with the display heads 170, three changes to the operating levels of the display heads 170, and three resource manager interrupts. The display software interface 152 transmits the appropriate state changes (i.e., changes to the parameter states associated with the display heads 170) to the display heads 170 during the state change update 270. Further, the display software interface 152 evaluates the state changes to determine the appropriate operating levels of the display devices 180 during the state change update 270 and decides which of the resource manager interrupts to include in the mode switch.

To ensure a smooth mode switch, the display software interface 152 is configured to identify any individual state change that may interrupt or corrupt the data flow to one or more of the display devices 180 during the mode switch operation. For example, a change to the phase-locked loop (PLL) frequency within the display head 170-1 could cause spurious data to flow from the display head 170-1 to the display device 180-1. Further, the display software interface 152 is configured to detect state changes that may cause the display devices 180 to pass through a transient mode that exceeds the limitations of the hardware in the computing system 100. For example, the state changes may include increasing the resolution parameter of the display head 170-1 from 1280-by-1024 pixels to 1900-by-1200 pixels and decreasing the resolution parameter of the display head 170-2 from 1900-by-1200 pixels to 1280-by-1024 pixels. Although the state change update 270 is configured to include all of the state changes to the display heads 170, the changes to the resolution parameters could affect each of the display heads 170 at a slightly different time. Consequently, the display heads 170 could pass through a mode where each of the display heads 170 transmits image frames to the attached display device 180 that have a resolution of 1900-by-1200. If the local memory 160 is not able to supply the required data at the required rate to support two display heads 170 configured in this fashion, then the data driving the display devices 180 could become corrupted.

After identifying any state changes that could potentially interrupt or corrupt the images sent to the display devices 180, the display software interface 152 is configured to reduce the operating levels of any affected display heads 170 before the state change update 270. In addition, the display software interface 152 is configured to select operating levels for the display heads 170 that not only ensure the integrity of the images displayed by the display devices 180, but also maximize the functionality of the display devices 180 during the state change update 270. For example, in a conservative approach to a mode switch, a display software interface may be configured to shutdown all of the display heads during the state change update associated with a particular mode switch. However, the display software interface 152 is advantageously configured to determine the most functional set of operating levels for maintaining the integrity of the images displayed on the display devices 180, while blanking or shutting down any display head 170 that exhibits undesirable behavior during the state change update 270.

In addition, the display software interface 152 is configured to customize the sequence of mode switch operations to reduce the operating level of the display heads 170 before the state change update 270 by setting the mode switch flags 224. For example, the display software interface 152 may set the mode switch flags 224 to indicate that, before the state change update 270, the display head 170-1 should be shutdown and the display head 170-2 should be blanked. While executing the sequence of mode switch operations before the state change update 270, the display software interface 152 sets the operating level of each display head 170 to the level indicated by the mode switch flags 224. Similarly, while executing the sequence of mode switch operations after the state change update 270, the display software interface 152 incrementally restores each display head 170 to its desired new operating level.

As previously described herein, in one embodiment, the display software interface 152 is configured to include three resource manager interrupts as part of the standard sequence of mode switch operations. However, the display software interface 152 may customize the standard sequence of mode switch operations to eliminate one or more of these interrupts.

During the three resource manager interrupts, the resource manager 132 is configured to perform operations that are not yet supported by the hardware. The display software interface 152 and the resource manager 132 are configured to communicate through various registers and control bits. The resource manager 132 is configured to read the state cache 222 to obtain the proposed mode and to read the mode switch flags 224 to evaluate any reduction in the operating levels of the display heads 170 to be implemented before the state change update 270. Furthermore, the resource manager 132 governs the values of a variety of control bits that override the registers, and therefore affect the mode switch operations executed by the display software interface 152. And, after completing any interrupt handling, the resource manager 132 returns control to the display software interface 152 by setting a "restart" control bit.

The first resource manager interrupt occurs before the display software interface 152 changes the operating level of any of the display heads 170. The second resource manager interrupt occurs after the display heads 170 have completed any blank or shutdown operations, but before the display software interface 152 executes the state change update 270. The third resource manager interrupt occurs after the display software interface 152 has executed the state change update 270 and the display heads 170 have completed any startup operations, but before the display software interface 152 executes any unblank operations. Scheduling the resource manager interrupts in this fashion allows the resource manager 132 to customize the mode switch before, during, and after the state change update 270.

During the first resource manager interrupt, the resource manager 132 performs a proposed mode re-validation 260 by determining the proposed state using the state cache 222, and calling the "is mode possible" function 210 to evaluate the proposed state. If the proposed mode re-validation 260 is successful, then the resource manager 132 performs other mode switch operations that are not yet supported in software. For example, the resource manager 132 is configured to evaluate the proposed mode in conjunction with the current mode in order to detect specific undesirable transient modes that may occur during the mode switch and that the display software interface 152 is not configured to detect. If the resource manager 132 detects the potential for any undesirable transient modes, then the resource manager sets control bits to override the mode switch flags 224, thereby configuring the display software interface 152 to reduce the operating level of the affected display heads 170 before the state change update 270. In this fashion, the display software interface 152 cooperates with the resource manager 132 to ensure a clean mode switch.

During the second and third resource manager interrupts, one or more of the display heads 170 may be blanked or shutdown. However, during the first interrupt, all of the display heads 170 are still active and, consequently, fully operational. Therefore, to minimize the amount of time that the display heads 170 are blanked or shutdown during the mode switch, the resource manager 132 is configured to perform the majority of software calculations associated with the mode switch during the first interrupt. For example, the resource manager 132 may be configured to calculate any new PLL settings during the first interrupt, although the resource manager 132 does not re-program the PLLs until the second interrupt. Also during the first interrupt, the resource manager 132 determines the values of control bits that determine whether the display software interface 152 skips either the second or third interrupt. During the second interrupt, the resource manager 132 executes operations that are optimally performed while the display drivers 170 are set to a non-active operating level. For example, during the second interrupt the resource manager 132 may program the PLLs and change the memory arbitration. During the third interrupt, the resource manager performs any final operations, such as initiating a re-draw to one or more of the display devices 180, before any blanked display heads 170 are unblanked.

As discussed above, the resource manager 132 includes an "is mode possible" function 210, which is called by the display driver 130 to validate a given mode and by the resource manager 132 to re-validate a given mode. Again, the "is mode possible" function 210 determines if the computing system 100 is capable of displaying accurate images on the display devices 180 when the computing system 100 is configured to operate in a specified mode. The "is mode possible" function 210 is typically written by a hardware developer and includes hardware-specific information, such as the capabilities of the local memory 160 and the display devices 180. For a given mode, one of the operations that the "is mode possible" function 210 performs is to determine if the local memory 160 is capable of delivering the various image frames at the speeds required to drive the display devices 180 simultaneously. For example, the "is mode possible" function 210 may evaluate the settings for various parameters (e.g., resolution, refresh rate, color depth etc.) for each of the display heads 170 in conjunction with the type of local memory 160 (e.g., DRAM type, memory burst length, etc.) to determine if the bandwidth of the local memory 160 can support the required data flow. Advantageously, the "is mode possible" function 210 reduces the likelihood of the computing system 100 being configured in undesirable modes.

Figure 3:
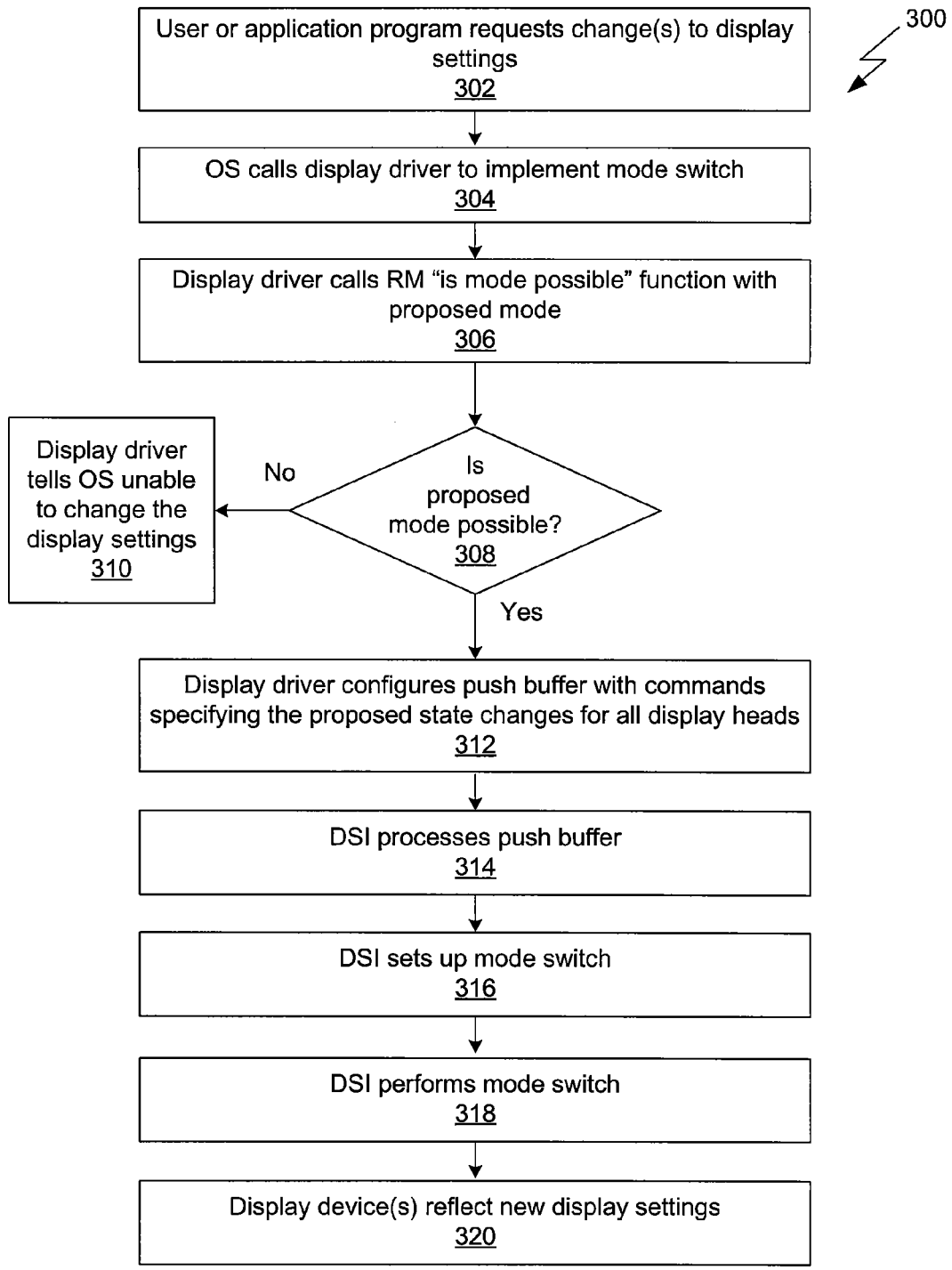
FIG. 3 is a flow diagram of method steps for implementing a mode switch, according to one embodiment of the invention.

FIG. 3 is a flow diagram of method steps for implementing a mode switch, according to one embodiment of the invention. Although the method steps are described in conjunction with the systems for FIGS. 1-2, persons skilled in the art will understand that any system that performs the method steps, in any order, is within the scope of the invention.

As shown, the method 300 begins at step 302, where the user or the application program 122 calls the operating system 124 to request a change to one or more display settings. In step 304, the operating system 124 calls the display driver 130 to implement a mode switch that reflects the requested change(s). The display driver 130 evaluates the current mode in conjunction with the requested change(s) to generate a proposed mode that is the target of the mode switch. In step 306, the display driver 130 calls the "is mode possible" function 210, included in the resource manager 132, to evaluate the proposed mode. As detailed above in conjunction with FIG. 2, the resource manager 132 then determines if the proposed mode is supported by the hardware within the computing system 100, and returns a mode validity value to the display driver 130. At step 308, the display driver 130 evaluates the mode validity value received from the resource manager 132. If the display driver 130 determines that the mode validity value indicates that the proposed mode is not supported by the hardware within the computing system 100, then the method 300 proceeds to step 310. In step 310, the display driver 130 conveys to the operating system 124 that the display driver 130 was unable to change the display settings as requested, and the method 300 terminates.

Figure 4:
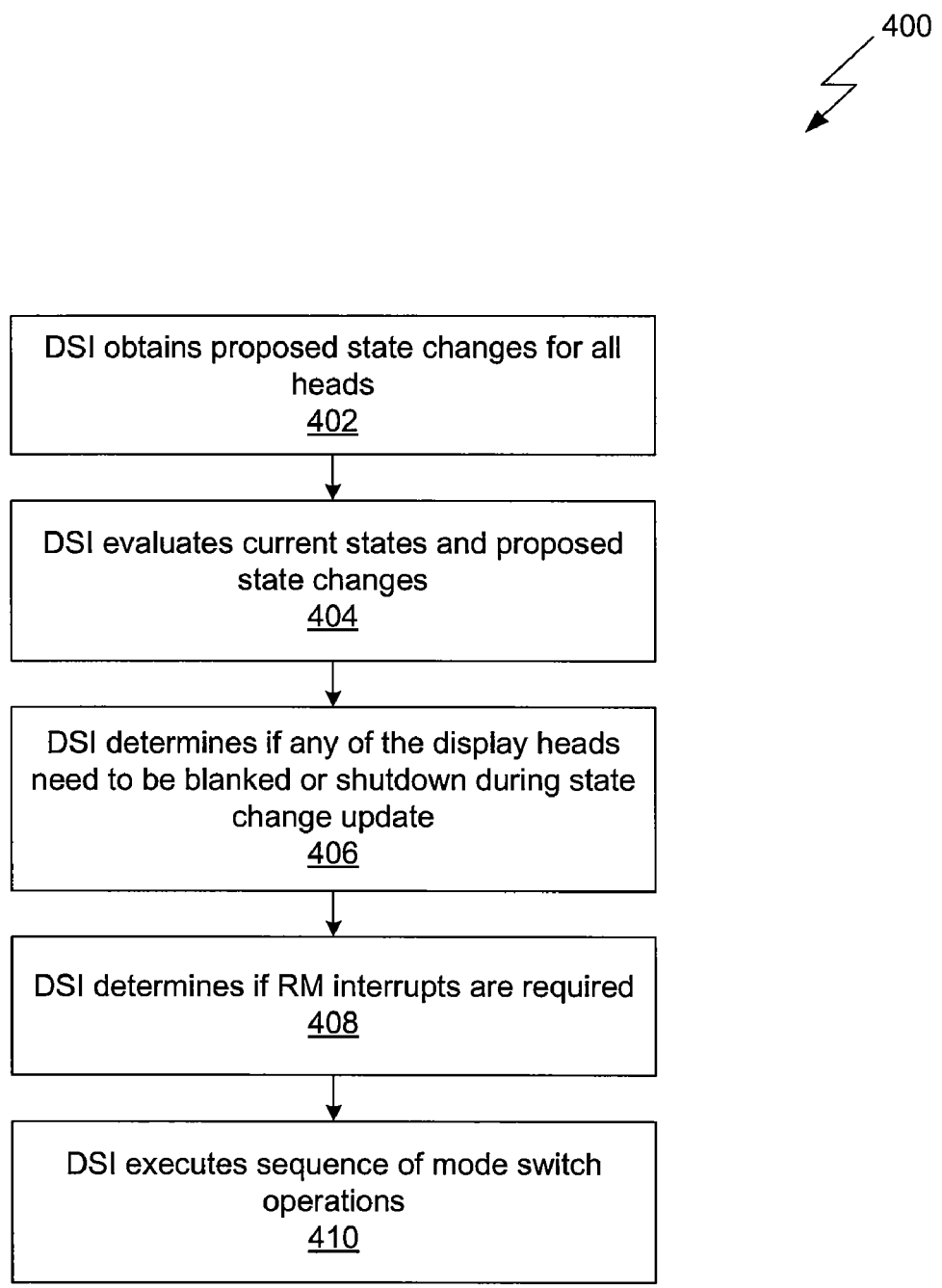
FIG. 4 is a flow diagram of method steps for setting up a mode switch, according to one embodiment of the invention.

If, in step 308, the display driver 130 determines that the mode validity value indicates that the proposed mode is supported by the hardware within the computing system 100, then the method 300 proceeds to step 312. In step 312, the display driver 130 configures the push buffer 162 to include commands that specify the proposed state changes corresponding to the mode switch. The display driver 130 also configures the display software interface 152 to process the push buffer 162. In step 314, the display software interface 152 processes the commands in the push buffer 162, thereby obtaining the proposed state changes for all of the display heads 170. In step 316, the display software interface 152 sets up the mode switch by customizing a sequence of mode switch operations. In step 318, the display software interface 152 performs the mode switch by executing a sequence of mode switch operations. In step 320, the display device(s) 180 reflect the new display settings. FIG. 4 elaborates on one way to accomplish step 316, and FIG. 5 elaborates on one way to accomplish step 318.

FIG. 4 is a flow diagram of method steps for setting up a mode switch, according to one embodiment of the invention. Although the method steps are described in conjunction with the systems for FIGS. 1-2, persons skilled in the art will understand that any system that performs the method steps, in any order, is within the scope of the invention.

As shown, the method 400 begins at step 402, where the display software interface 152 obtains a set of proposed state changes for the display heads 170. As detailed above in step 312 of FIG. 3, the display driver 130 configures the display software interface 152 to process the push buffer 162 in order to obtain the proposed state changes. In step 404, the display software interface 152 evaluates the current states of the display heads 170 in conjunction with the proposed state changes according to the parameter states stored in the state cache 222. In step 406, the display software interface 152 determines if any of the display heads 170 need to be blanked or shutdown during the state change update 270 to ensure the integrity of the images displayed on the display devices 180. As detailed above in conjunction with FIG. 2, the display software interface 152 is configured to identify conditions that may interrupt or corrupt the data flow to one or more of the display devices 180 and set the mode switch flags 224 to preventatively blank or shutdown any implicated display heads 170 before the state change update 270. In step 408, the display software interface 152 determines if any interrupts to the resource manager 132 are required during the mode switch. As also detailed above in conjunction with FIG. 2, the mode switch typically includes three interrupts to the resource manager 132. However the display software interface 152 may identify mode switches that do not require all three interrupts and set control bits to customize the sequence of mode switch operations to eliminate one or more of the interrupts. In step 410, the display software interface 152 executes the sequence of mode switch operations that has been customized in steps 404-408 to implement the mode switch defined by the proposed state change obtained in step 402. Again, a series of method steps for performing the mode switch is described in greater detail below in method 500 of FIG. 5.

In alternative embodiments, the display software interface may be configured to schedule all three interrupts or no interrupts.

Figure 5:
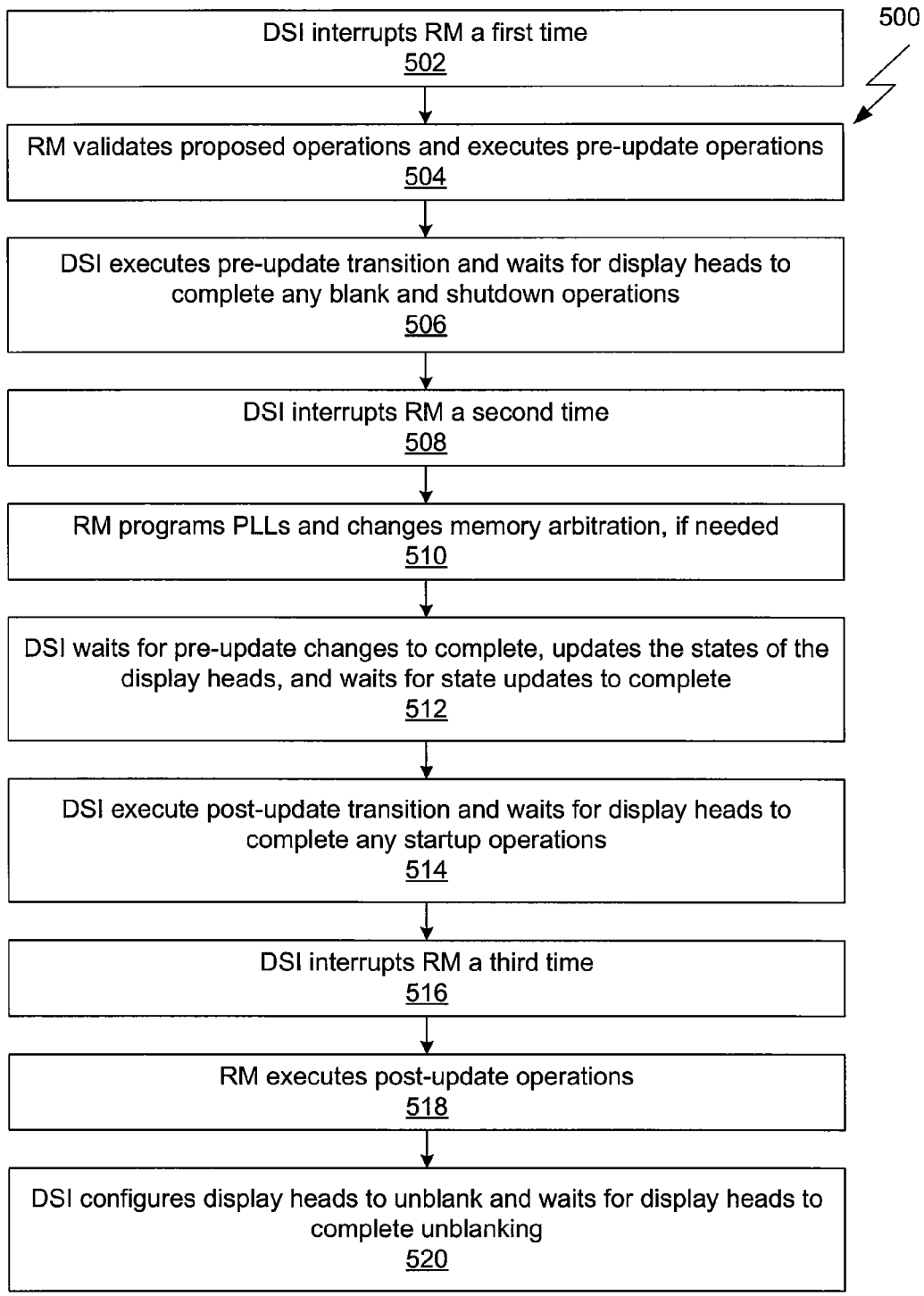
FIG. 5 is a flow diagram of method steps for performing a mode switch, according to one embodiment of the invention.

FIG. 5 is a flow diagram of method steps for performing a mode switch, according to one embodiment of the invention. Although the method steps are described in conjunction with the systems for FIGS. 1-2, persons skilled in the art will understand that any system that performs the method steps, in any order, is within the scope of the invention.

As shown, the method 500 begins at step 502, where the display software interface 152 interrupts the resource manager 132. In step 504, the resource manager 132 validates the proposed operations that have been configured to be performed during the mode switch, and executes pre-update operations. As detailed above in conjunction with FIG. 2, the resource manager 132 calls the "is mode possible" function 210 to re-validate the proposed mode. The pre-update operations, as also detailed in conjunction with FIG. 2, may include a variety of operations and computations that are not yet supported by the hardware. For example, the resource manager 132 may identify and schedule additional blank or shutdown operations for the display heads 170 to ensure a smooth mode switch, and may perform computations that are used throughout the mode switch. To minimize the amount of time that the display heads 170 may not be fully functional, the resource manager 132 is configured to perform the majority of the mode switch operations and computations that are not supported by the hardware during step 504. After completing the interrupt handling, the resource manager 132 returns control of the mode switch to the display software interface 152. Note that, as detailed above in conjunction with FIG. 2, the display software interface 152 may be configured to skip steps 502-504.

In step 506, the display software interface 152 executes a pre-update transition in which various display heads 170 may be blanked or shutdown. The display software interface 152 waits for the display heads 170 to complete any blank and shutdown operations, and then proceeds to step 508. In step 508, the display software interface 502 interrupts the resource manager 132 a second time. In step 510, the resource manager 132 performs additional mode switch operations and computations that are not supported in the hardware, such as programming any PLL updates and executing any required memory arbitration changes. Typically, the resource manager 132 performs operations during step 510 that are optimally executed while the display heads 170 are either blanked or shutdown. After completing the interrupt handling, the resource manager 132 returns control of the mode switch to the display software interface 152. Note that, as detailed above in conjunction with FIG. 2, the display software interface 152 may be configured to skip steps 508-510.

In step 512, the display software interface 152 waits for any pre-update changes to complete, such as any affected PLLs to settle. The display software interface 152 may determine the wait period in any technically feasible fashion, such as waiting a pre-determined length of time or waiting a length of time that is assigned by the resource manager 132 in step 504 or 510. Then, the display software interface 152 updates the states of the parameters of the display heads 170 to reflect the proposed parameter states specified in the state cache 220. And, the display software interface 152 waits for the state updates to complete. In step 514 the display software interface 152 execute a post-update transition in which any display heads 170 that were shutdown in step 506 may be restarted. The display software interface 152 waits for the display heads 170 to complete any startup operations, and then proceeds to step 516. In step 516, the display software interface 152 interrupts the resource manager 132 a third time. In step 518, the resource manager 132 performs any post-update operations, such as initiating a re-draw to one or more of the display devices 180. After completing the interrupt handling, the resource manager 132 returns control of the mode switch to the display software interface 152. In step 520, the display software interface 152 configures any blanked display heads 170 to unblank. After the display heads 170 have completed any unblanking operations, the method 500 terminates. Note that, as detailed above in conjunction with FIG. 2, the display software interface 152 may be configured to skip steps 516-518.

In an alternative embodiment, the initial step of validating the proposed mode (i.e., element 240 of FIG. 2 and step 306 of FIG. 3) performed by the display driver and the resource manager may be skipped. In such an embodiment, the proposed mode is validated by the resource manager during the first interrupt, as described above in the "re-validation" steps of FIGS. 2 and 5 (i.e., element 260 of FIG. 2 and step 504 of FIG. 5).

In sum, a display software interface (DSI) hardware module within a graphics processing unit (GPU) may be configured to efficiently control mode switches. The operating system (OS) receives a request to change the display settings, and the OS conveys this request to a display driver. Upon receiving the request, the display driver evaluates the changes in conjunction with the current mode to generate a proposed mode. The display driver may then call a resource manager (RM) function, "is mode possible," to validate that the proposed mode is supported by the hardware within the computing system. If the proposed mode is supported, then the display driver creates a push buffer of commands in the local memory associated with the GPU. This push buffer specifies any changes required to the states of the display heads to reflect the proposed mode. The DSI processes the commands in the push buffer and customizes a sequence of hardware operations used to execute the mode switch.

The sequence includes not only operations to update the states of the display heads to reflect the proposed mode, but also operations to ensure the integrity of any images displayed on the display devices. For example, the sequence may include operations designed to ensure that the computing system does not pass through transient modes that exceed the limitations of the hardware display devices as well as operations to ensure that the display devices are not driven by corrupted data. While conducting the mode switch, the DSI may blank various display heads and shutdown other display heads, thereby transitioning the display heads to an operating level with lower functionality than either the current mode or the proposed mode. Furthermore, the DSI may schedule interrupts to the RM at three separate times during the mode switch. During these interrupts, the RM may re-validate the proposed mode, calling the "is mode possible" function, or perform operations that are not yet supported by the hardware.

Controlling and executing mode switches primarily in hardware instead of software advantageously reduces the quantity of hardware-specific details included in the associated software. Therefore, the software is both simpler and less error-prone relative to software used in prior-art approaches. In addition, by reducing hardware-software interactions, the efficiency of mode switches is increased and, consequently, the length of time that the display devices are blanked or shutdown during some mode switches is decreased. Finally, since the DSI is configured to consider the limitations of the underlying hardware, the DSI is able to orchestrate mode switches that avoid conditions that are not supported by the hardware.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for performing a mode switch to change a plurality of display parameters used to display images, the method comprising:
    interrupting a resource manager software engine to validate one or more proposed operations for updating one or more display settings,
    executing a pre-update transition to prepare one or more display heads for receiving the one or more updated display settings, wherein executing the pre-update transition comprises blanking or shutting down at least one of the one or more display heads based on one or more mode switch flags and one or more override registers;
    transmitting the one or more updated display settings to the one or more display heads; and
    executing a post-update transition to prepare the one or more display heads for operating with the one or more updated display settings.

2. The method of claim 1, further comprising the step of interrupting the resource manager software engine to perform, in software, update operations not supported by system hardware.

3. The method of claim 2, wherein the update operations performed in software include programming one or more phase lock loops or changing memory arbitration.

4. The method of claim 2, further comprising the step of interrupting the resource manager software engine to perform, in software, post-update operations not supported by system hardware.

5. The method of claim 1, further comprising the step of unblanking at least one of the one or more display heads to reflect final operating levels.

6. The method of claim 1, wherein validating the one or more proposed operations to update the one or more display settings includes executing a function to evaluate whether the one or more proposed operations are supported by system hardware.

7. The method of claim 6, wherein evaluating whether the one or more proposed operations are supported by system hardware includes analyzing a state cache and one or more mode switch flags.

8. The method of claim 6, wherein executing the post-update transition to prepare the one or more display heads for operating with the one or more updated display settings comprises starting up one of the one or more display heads shut down in the pre-update transition.

9. The method of claim 1, further comprising the steps of setting one or more override registers to modify the one or more proposed operations, and performing one or more software calculations not supported by system hardware, when the resource manager software engine is interrupted to validate the one or more proposed operations.

10. A computing system configured to perform a mode switch to change a plurality of display parameters used to display images, the computing system comprising:
   a processing unit that includes a display software interface (DSI); and
   a memory coupled to the processing unit, wherein a resource manager software engine resides within the memory, and the DSI is configured to:
      interrupt a resource manager software engine to validate one or more proposed operations for updating one or more display settings,
      execute a pre-update transition to prepare one or more display heads for receiving the one or more updated display settings, wherein the DSI is configured to blank or shut down at least one of the one or more display heads based on one or more mode switch flags and one or more override registers,
      transmit the one or more updated display settings to the one or more display heads, and
      execute a post-update transition to prepare the one or more display heads for operating with the one or more updated display settings.

11. The computing system of claim 10, wherein the DSI is configured to interrupt the resource manager software engine to perform, in software, update operations not supported by system hardware.

12. The computing system of claim 11, wherein the update operations performed in software include programming one or more phase lock loops or changing memory arbitration.

13. The computing system of claim 11, wherein the DSI is configured to interrupt the resource manager software engine to perform, in software, post-update operations not supported by system hardware.

14. The computing system of claim 10, wherein the DSI is configured to unblank at least one of the one or more display heads to reflect final operating levels.

15. The computing system of claim 10, wherein, to validate the one or more proposed operations to update the one or more display settings, the resource manager software engine is configured to execute a function to evaluate whether the one or more proposed operations are supported by system hardware.

16. The computing system of claim 15, wherein evaluating whether the one or more proposed operations are supported by system hardware includes analyzing a state cache and one or more mode switch flags.

17. The computing system of claim 15, wherein, to execute the post-update transition to prepare the one or more display heads for operating with the one or more updated display settings, the DSI is configured to start up one of the one or more display heads shut down in the pre-update transition.

18. The computing system of claim 10, wherein, when interrupted to validate the one or more proposed operations, the resource manager software engine is configured to set one or more override registers to modify the one or more proposed operations, and perform one or more software calculations not supported by system hardware.

19. The computing system of claim 10, further comprising a central processing unit, and wherein the processing unit comprises a graphics processing unit.

* * * * *